March 7, 1967 C. D. RUSSELL 3,307,508

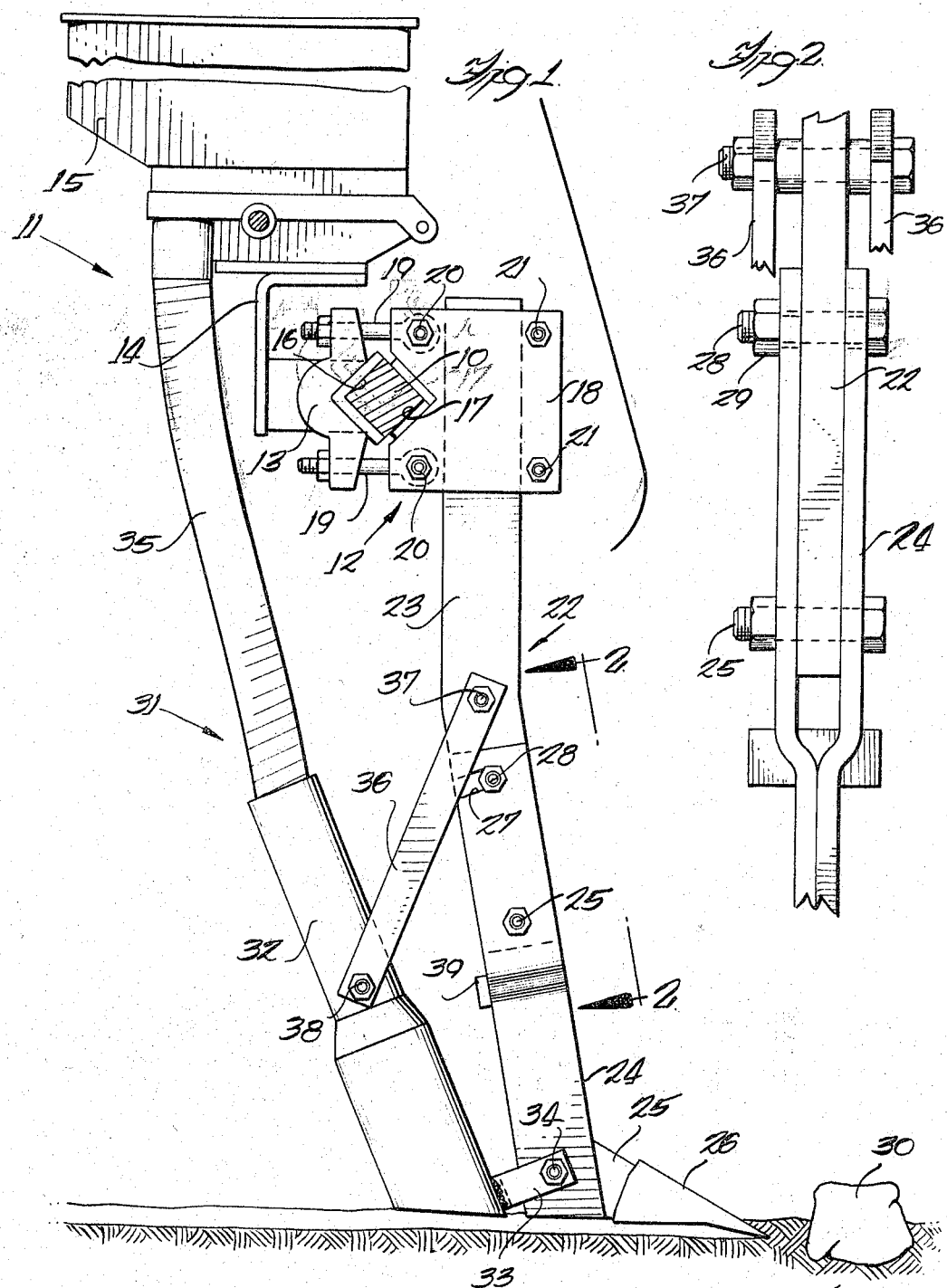

EARTH WORKING IMPLEMENT

Filed May 21, 1965 2 Sheets-Sheet 2

Inventor
Carl D Russell

United States Patent Office 3,307,508
Patented Mar. 7, 1967

3,307,508
EARTH WORKING IMPLEMENT
Carl D. Russell, Naperville, Ill., assignor to International Harvester Company, Chicago, Ill., a corporation of New Jersey
Filed May 21, 1965, Ser. No. 457,652
7 Claims. (Cl. 111—86)

This invention relates to agricultural implements and particularly to apparatus for sowing materials such as seed, fertilizer and the like.

In present machines discharging fertilizer and the like through flexible conduits to furrow openers, where the furrow opener is allowed to trip when abnormal draft conditions are encountered, no provision is made for the protection of the conduit by the tripping tool, the conduit usually being squeezed between the tool and the supporting frame or tool standard. Therefore, an object of the present invention is the provision of an improved and simplified trip assembly of economical construction for a material dispensing and furrow opening machine, wherein the conduit for conducting the material to the ground is mounted on the furrow opener to trip with it.

Another object of the invention is the provision, in a trip assembly including a furrow opener and a conduit in close association with it for delivering materials such as fertilizer or the like to the furrow formed by the furrow opener, of novel means for mounting the conduit on the furrow opener unit to avoid pinching or otherwise damaging the conduit when the furrow opener and the conduit trip under abnormal draft conditions.

Other objects and advantages of the invention will become clear from the following detailed description when read in conjunction with the accompanying drawings wherein FIGURE 1 is a view in side elevation, partly in section, of a portion of a furrow opening and fertilizer depositing machine incorporating the features of this invention.

FIGURE 2 is a view taken on the line 2—2 of FIGURE 1, and

Figure 3:
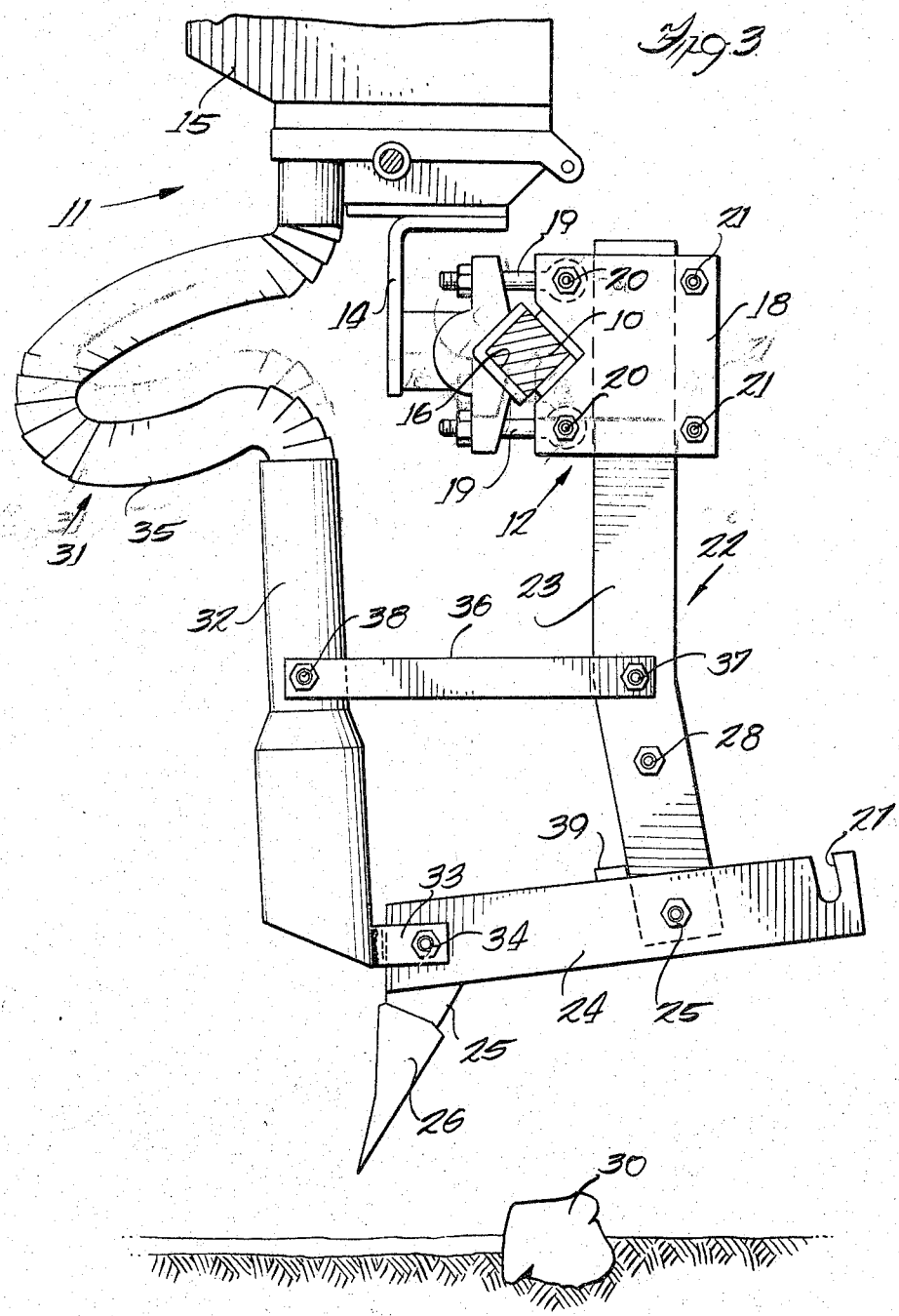
FIGURE 3 is a view similar to FIGURE 1 showing the furrow opening and fertilizer conducting apparatus in tripped position.

Referring to the drawings, the numeral 10 designates a transversely extending tool bar adapted for connection by any suitable means, not shown, to a tractor, also not shown, to be propelled thereby.

A fertilizing assembly 11 is mounted on the tool bar 10, and it may be understood that a plurality of such assemblies may be mounted at spaced locations on the tool bar.

The assembly 11 is secured to the tool bar 10 by clamping means 12 comprising a clamping element 13 to which is affixed a bracket 14 upon which is mounted a fertilizer hopper 15, although it may be understood that, if desired, seed or other material may be carried thereby. Clamping element 13 has a V-shaped notch 16 conforming to the shape of a portion of square tool bar 10, and an oppositely disposed notch 17 is formed in a pair of plates forming another element 18 of the clamping structure 12. Clamping element 13 is preferably provided with open ended slots to receive eye-bolts 19 pivotally mounted on bolts 20 carried between the plates of clamping element 18.

Bolts 20 are vertically spaced and parallel to vertically spaced bolts 21 also carried by clamping element 18 and spaced from bolts 20 to adjustably receive therebetween the upper end of a generally vertically extending standard 22 forming a portion of the relatively rigid supporting frame of the implement which includes tool bar 10 and bracket 14.

Tool standard 22 includes a relatively rigid upper standard portion 23, which is disposed generally vertically, and a lower standard portion 24, in alignment with the lower end of upper portion 23, and having mounted on its lower end a shoe 25 to which is removably secured an earth penetrating tool in the form of a furrow opener 26.

Lower standard portion 24 is bifurcated as shown in FIGURE 2 to receive the lower end of upper standard portion 23, and is pivotally connected thereto, medially of its ends, by a pivot bolt 25 for swinging about a transverse axis from the generally vertical operating position of FIGURE 1 to a tripped position as shown in FIGURE 3 with the lower standard portion 24 generally horizontal.

The end of lower standard portion 24 extending above pivot bolt 25 is provided with rearwardly opening slots 27 to receive a bolt 28 carried by the upper standard portion 23 and having a nut 29 for tightening the bolt to frictionally hold the tool carrying lower standard portion 24 in the normal operating position of FIGURE 1 until abnormal draft conditions such as the obstruction 30 are encountered sufficient to overcome the frictional resistance of bolt 28, causing the furrow opener to trip.

In order that the fertilizer or other material contained in the hopper 15 may be deposited in the furrow formed by tool 26 as soon as the furrow is opened, a conduit 31 is provided which includes a relatively rigid lower section 32 having at its lower end a lug 33 apertured to receive a pivot bolt 34 carried by the lower end of standard 22 adjacent the furrow opener 26. The lower conduit section 32 extends rearwardly and upwardly from the furrow opener and is connected to the lower end of an upper flexible conduit section 35, the upper end of which is connected to the hopper 15 to receive material discharged therefrom and guide it through the lower section 32 to the furrow in the ground.

A spacer link 36 has its upper end pivotally connected by a bolt 37 to the upper standard portion 23 and extends downwardly and rearwardly therefrom for pivotal connection at its other end to the lower conduit section 32 by a bolt 38. As shown in FIGURE 2, link 36 is one of a pair straddling the upper rigid portion 23 of the tool standard and the relatively rigid conduit section 32.

As shown in FIGURE 3, upon encountering an obstruction, the lower standard portion 24 with furrow opener 26 and lower conduit section 32, swings rearwardly and upwardly about the axis of pivot bolt 25 until standard portion 24 is generally horizontal and generally parallel to the upper link 36, and forms a substantial parallelogram with the lower conduit section 32 and upper standard portion 23, the relatively rigid lower conduit section 32 being generally vertical and spaced rearwardly of the standard 22, in such a position that the flexible section 35 of the conduit is not endangered by contact with the standard or other parts of the supporting framework of the implement. A stop 39 affixed to the rear of lower standard portion 24 engages upper member 23 to limit upward swinging of furrow opener.

It is believed that the novel furrow opener and material guiding assembly of this invention will be clearly understood from the foregoing description. It should likewise be understood that the invention has been described in its preferred embodiment and that modifications may be made therein without departing from the spirit of the invention or the scope of the appended claims.

I claim:

1. In planters and the like including a supporting frame having a material dispensing hopper mounted thereon, a generally vertical tool standard carrying a furrow opener at its lower end and having a pivotal connection to the supporting frame accommodating swinging of the standard rearwardly and upwardly to a generally horizontal tripped position, a generally vertical conduit connected at its upper end of the hopper and operatively connected at its lower end of the furrow opener for tripping therewith, and a link pivotally connected at one end to the supporting frame and at its other end to said vertical conduit, said link being disposed in the tripped position of the furrow opener in generally parallel relation to said standard.

2. The invention set forth in claim 1, wherein said conduit comprises a relatively rigid section pivotally connected at its lower end to said standard and at its upper end to said other end of said link and a flexible section extending from said rigid section to the hopper, said relatively rigid section being disposed generally vertically in the tripped position of the furrow opener.

3. The invention set forth in claim 2, wherein said standard is further connected to the frame by means adapted to prevent tripping of the furrow opener under normal draft conditions and releasable under abnormal draft conditions to accommodate tripping of the furrow opener.

4. The invention set forth in claim 3, wherein said standard includes an upper rigid generally vertical portion and said tool standard is the lower portion pivotally connected to the upper portion and swingable relative thereto to a tripped position wherein said relatively rigid section of said conduit forms a substantial parallelogram with the upper and lower standard sections and said link.

5. The invention set forth in claim 4, wherein said lower portion of said standard is pivotally connected medially of its ends to said upper portion and the upper end of said lower standard portion is frictionally secured to said upper standard portion for release under abnormal draft conditions to accommodate tripping of the furrow opener.

6. In planters and the like including a supporting frame having a material dispensing hopper and a tool standard mounted thereon, a furrow opener pivotally mounted on said standard for tripping rearwardly and upwardly relative thereto, and means for guiding material from the hopper to the furrow opener comprising, a conduit including a relatively rigid lower section having a pivotal connection to said furrow opener below the pivotal connection of the latter to the standard to accommodate tripping of said lower conduit section with the furrow opener, said conduit including a flexible upper section connecting said rigid lower section to said hopper, and a link spacing the upper end of said lower conduit section from said furrow opener and pivotally connected at one end to said lower conduit section and at its other end to said standard.

7. In planters and the like including a supporting frame having a material dispensing hopper thereon and a generally vertical frame portion, a furrow opener pivotally mounted on said generally vertical portion, means holding said furrow opener in its operating position under normal draft conditions, said holding means being releasable when abnormal draft conditions are encountered to accommodate tripping of the furrow opener, a conduit disposed rearwardly of said furrow opener extending therebetween and said hopper for conducting material dispensed from the latter to the furrow formed by the furrow opener including a relatively rigid lower section pivotally connected at its lower end to said furrow opener and extending upwardly and rearwardly therefrom and a relatively flexible upper section extending from said rigid section to said hopper, a relatively long link pivotally connected at one end to said generally vertical frame portion and extending downwardly and rearwardly therefrom, means pivotally connecting the other end of said link to said lower section at a location vertically spaced above the connection of the latter to said furrow opener to accommodate tripping of said conduit rearwardly and upwardly with said furrow opener to a position with said lower section generally parallel to said generally vertical frame portion.

References Cited by the Examiner
UNITED STATES PATENTS

| | | | |
|---|---|---|---|
| 1,006,771 | 10/1911 | Metzler | 111—80 |
| 2,292,909 | 8/1942 | Thoma et al. | 111—86 |
| 2,322,332 | 6/1943 | White | 111—69 |

ABRAHAM G. STONE, *Primary Examiner.*

R. CARTER, *Assistant Examiner.*